United States Patent
Klinge

[15] 3,663,290
[45] May 16, 1972

[54] TEMPERATURE RESISTANT COATING AND METHOD

[72] Inventor: James L. Klinge, Indianapolis, Ind.
[73] Assignee: Klinge Enameling Company, Inc., Indianapolis, Ind.
[22] Filed: Dec. 17, 1969
[21] Appl. No.: 886,003

[52] U.S. Cl. ............................ 117/8, 117/11, 117/70 B, 117/70 C, 117/70 S, 117/104 R, 117/119.6
[51] Int. Cl. ................. B44d 1/08, B44d 1/14, B44d 1/46
[58] Field of Search ............... 117/8, 8.5, 45, 119.6, 70 S, 117/70 C, 11, 70 B

[56] References Cited

UNITED STATES PATENTS

| | | | |
|---|---|---|---|
| 916,516 | 3/1909 | Williams | 117/45 |
| 1,744,116 | 1/1930 | Hannen et al. | 117/8 |
| 1,976,157 | 10/1934 | Bloom | 117/45 UX |
| 2,372,285 | 3/1945 | Marc et al. | 117/70 |
| 2,509,875 | 5/1950 | McDonald | 117/70 X |
| 2,681,865 | 6/1954 | Heine | 117/8 |
| 2,998,328 | 8/1961 | Munger et al. | 117/70 X |
| 3,208,874 | 9/1965 | Conner, Jr. | 117/135.1 |
| 3,531,311 | 9/1970 | Prior | 117/8.5 X |

*Primary Examiner*—Ralph S. Kendall
*Assistant Examiner*—Thomas E. Bokan
*Attorney*—Woodard, Weikart, Emhardt & Naughton

[57] ABSTRACT

A member is coated in three coating steps, including first and final coats of a clear solution of an alkali metal silicate, and an intermediate coat of an opaque solution of an alkali metal silicate, each coating followed by a high temperature cure. The concentration of silicate in solution is limited to avoid frosting and discoloration when subjected to heat. The clear solution includes clay and a binder for mar resistance and adhesion. The opaque solution includes a pigment and a binder.

10 Claims, No Drawings

TEMPERATURE RESISTANT COATING AND METHOD

BACKGROUND OF THE INVENTION

1. Field of the Invention

This invention relates generally to protective coatings for metals and other materials, and more particularly to a protective coating capable of withstanding comparatively high ambient and contact temperatures, and a method for application of the same.

Description of the Prior Art

Various types of high temperature coatings have been devised. Unfortunately, most such coatings that are known have some shortcomings from the standpoint of durability against abrasion, chemical attack, cost, temperature limitations, and adaptability to various types of application procedures. A material and methods of application thereof for protective surface finishing of stainless steel are described in U.S. Pat. No. 3,208,874 issued Sept. 28, 1965 to Jesse R. Conner, Jr. It is intended that the material disclosed in that patent application remain clear and provide protection at a broad range of temperatures. However there is some difficulty with frosting or discoloring at higher temperatures during curing, and also there is a need for protective coatings other than the strictly transparent variety. The present invention is directed toward provision of a protective coating of either a clear or opaque type and which will withstand mechanical abrasion and high temperatures in chemically adverse environments.

SUMMARY

Described briefly, in a typical embodiment of the present invention, clay and a binder in a clear solution of an alkali metal silicate are applied to a member, followed by a cure. Then a pigment and a binder in a non-clear solution of an alkali metal silicate are applied, followed by a cure. Then more of the clear solution is applied, and cured. Appropriate cleaning and handling steps are employed.

DESCRIPTION OF THE PREFERRED EMBODIMENT

As discussed in the aforementioned patent, alkali metal silicate solutions are useful for protective coatings. The aforementioned patent describes their use with stainless steel, and the intention is to provide a clear coating. In the present instance, however, an objective is to provide a durable heat resistant coating which may be either clear or opaque, and use the same on various materials including metals other than stainless steel.

For purposes of this invention, as in the above mentioned patent, it appears that any silicate compound that is soluble in water may be employed for the silicate coating. As a practical matter, it is the alkali metal silicates including such materials as lithium, potassium and sodium, which are soluble to any significant extent in water. Any of these alkali metal silicates may be used, but because sodium silicate is the most readily available and works quite well, the examples will be presented accordingly. As discussed in the foregoing patent, the composition of silicates are usually expressed as $SiO_2$; $M_2O$ ratios (where $M_2O$ is the alkali metal oxide). Some examples of ratios suitable in the practice of the present invention appear in the aforementioned patent but it is believed that the ratios of silica to alkali between 1.50 : 1 and 3.80:1 are preferable.

One environment which is proposed for satisfactory use of my coatings over a period of time is the exterior surface of a cooking appliance. Thus it is desirable that the coating be able to withstand not only elevated temperatures and moisture, but also that it be able to withstand a reasonable amount of scouring. The alkali metal silicate coating as described in the aforementioned patent has been found inadequate for this environment. I have found that by the addition of kaolinitic clays, mar resistance, heat resistance and water resistance are markedly improved. I have also found that the addition of vinyl acetate or ethyl acrylate enhances the adhesion and moisture resistance. The mixing and application of these ingredients is aided by the use of a surface active agent ("surfactant"), and is particularly helpful for dispersion of a pigment where the coating is not intended to be clear and transparent. However, as noted hereinafter, some surfactants may not work well where clay is used.

For the opaque coating, I have found that less than 15 percent pigment will not give full coverage in one coating, if the coat is to be thin enough to avoid frosting or bubbling during curing. I have also found that a higher percentage of pigment than 50 percent by volume will tend to result in surfacing or wiping off of the outer layer pigments.

While it appears that at least 20 percent silicate is needed, I have found that where the percentage of silicate is over 50 percent by volume, frosting will occur at curing temperatures above the boiling point of water, so it is much preferable to employ at least 3 parts by volume of water to 1 part by volume dry silicate powder for durability in use at temperatures over 200° Fahrenheit. Where silicate is added in a liquid form as described below, if more than 50 percent is used, the coating solution will not withstand direct flame or rapid temperature rise in use. While it will be glossy, it will also tend to be brittle and chip. Where end use of the product may involve exposure to an open flame, as in cooking appliances, the percentage of silicate should not exceed 25 percent in a clear solution. Where pigment is included, the percentage silicate may be somewhat higher, up to 35 percent, for example.

The coating may be applied by flow coating, dip, brush, or spray. Spraying is believed preferable for thickness control, in order to avoid bubbling, frothing and frosting during and after curing. Conventional cleaning and surface preparation techniques may be employed. Mechanical blasting is preferred for hard materials, and aluminum or zinc sulfate can be used where the coating is to be applied on paper or board products. A glossier finish on metal products can be obtained if the glass bead blast (200 mesh, for example) is used instead of a heavy oxide blast.

In the examples which follow, the temperatures mentioned are in degrees Fahrenheit.

EXAMPLE 1

A hot rolled steel member is degreased. This is followed by a mechanical treatment to roughen the surface by blasting with aluminum oxide grains 120 mesh or finer. The part is handled thereafter with protective gloves to avoid handprints or fingerprints, and any aluminum oxide dust is blown off the surface with air.

The clear solution is applied with a spray gun making one pass or series of passes in one direction, followed promptly by a pass or series of passes in a direction transverse thereto to establish a single wet crisscross coat less than one-thousandth inch (1 mil) thick. The product is then cured at a 300° Fahrenheit metal surface temperature for one-half hour.

Following the cure, the opaque coating is applied with a single wet sprayed crisscross coat less than 1 mil wet thickness. This is allowed to air dry for 10 minutes, followed by light sanding through the opaque coat at various spots on the surface for a decorative effect. This is followed by a one-half hour cure at a metal temperature of 400° Fahrenheit.

Following the 400° cure, any heat discoloration which may occur at the light spots where the opaque coating was removed by the sanding, is removed by emery cloth. Then the part is cleaned with lacquer thinner, followed by an air blast for lint removal from the surface.

Then the clear solution is applied over the opaque coating as well as the light spots where the opaque coating was sanded off. Again it is a single wet crisscross coat less than 1 mil thick. This is followed by an air dry for 20 minutes, followed by a low bake or "flash" at 200° for 10 minutes, followed by a one-half hour high bake or cure at 500° Fahrenheit. The product is then ready for shipment.

EXAMPLE 2

A steel member is mechanically cleaned by an abrasive blast to roughen the surface. Dust is blown off by air and an opaque alkali metal silicate coating solution is spray applied. This is allowed to air dry, followed by sanding through the opaque coating at various spots thereon for the decorative effect. The coating is then cured for one-half hour at 400° Fahrenheit. Any discoloration is removed by emery cloth and the surface is then cleaned and dried. This is followed by spray application of a clear protective coating in the crisscross manner over both the opaque and sanded areas. This is followed by an air dry for 20 minutes followed by a 200° flash for 10 to 20 minutes and a full cure of one-half hour at 550°. The product is then ready for packaging and shipment. Suitable results can be had with the flash at a member temperature between 180° and 210° F for between 5 and 25 minutes, and full cure at a member temperature between 450° and 550° F for a period between 5 and 25 minutes.

EXAMPLE 3

A steel member is mechanically cleaned by an abrasive blast to roughen the surface. Dust is blown off by air and an opaque alkali metal silicate coating solution is applied. This is allowed to air dry 10 minutes, followed by a 200° flash for 20 minutes followed by a high bake or cure for one-half hour at 450° Fahrenheit. The product is then ready for packaging and shipment.

EXAMPLE 4

An aluminum member is cleaned. The member is dipped in the clear solution and withdrawn at a rate avoiding running of the coating. It is cured at a metal temperature of 250° for 20 minutes. The member thus coated is then dipped in a pigmented solution and withdrawn at a rate avoiding running of the coating. It is then cured at a metal temperature of 350° for 20 minutes.

In the foregoing examples, application at normal indoor room temperatures works very well.

Some examples of the coating solutions and methods of making the same are as follows:

For the clear solution of Example 1 above, add four parts by volume of water to one part by volume concentrated sodium silicate "N" in a container and mix thoroughly on a Red Devil shaker with shot (BB for example) therein. Add 5 to 10 percent by volume of a Kaolinitic clay and eight per cent by volume of a vinyl acetate No. 825L to the sodium silicate solution and mix thoroughly on the Red Devil shaker with shot therein. Once thoroughly mixed, the shot is removed and the material strained and the solution is ready for application.

The so-called sodium silicate "N" is a product available by that designation from Philadelphia Quartz Company, Philadelphia, Pennsylvania 19106 and has a ratio of silica to alkali of 3.22. The concentrated solution used in these examples contains 62.4 percent water, 8.9 percent $Na_2O$, and 28.7 percent $SiO_2$. The No. 825L ("Polectron") vinyl acetate is a vinyl pyrrolidone copolymer available from the GAF Corporation, Chicago, Illinois. It resists water and acts as a binder for the end product. No. 10 Tennessee clay available from the American Art Clay Company of Indianapolis, Indiana is an example of a suitable clay.

An example of the opaque solution and the method of making the same is as follows:

Mix 1 part by volume of water to 1 part by volume of Ferro V-5774 black powder. Add one-sixteenth part 60K surfactant solution and one-sixteenth part No. 825L vinyl acetate. This provides, for example, 24 fluid ounces of powder, 24 fluid ounces of water, 3 ounces surfactant and 3 ounces of vinyl acetate. This is shaken 20 minutes on a Red Devil shaker with shot (BB) (steel balls) in the container. Then add 1 part sodium silicate. Shake for 10 minutes on the Red Devil shaker with the shot. Separate the shot from the solution and strain.

The solution is then ready for application. At room temperature this solution has a viscosity of 25 to 30 seconds (Zahn No. 2 viscosity cup).

The aforementioned powder is a channel black powder and the above designation is that furnished by Ferro Corporation of Cleveland, Ohio. The surfactant mentioned above is "Ultrawet 60-K" as furnished by the Arco Chemical Company, 332 South Michigan Avenue, Chicago, Illinois 60604. This anionic surfactant is a sodium linear alkylate sulfonate slurry. It can be used successfully in a range of 5 to 15 percent by volume, about 7 or 8 percent being preferable.

Another example of an opaque solution (percentages expressed in volume) is as follows:

Mix 40 percent water to 30 percent Ferro V-5774 black powder. Add 10 percent dry clay and 10 percent vinyl acetate No. 825L and mix thoroughly by shaking on a Red Devil shaker with shot in the container. Add 20 percent sodium silicate and shake for 10 minutes with shot. Separate the shot and strain. The solution is ready for application.

Where the opaque solution is to be used by itself, without previous or subsequent application of the clear solution, it is preferable to use clay. However I have found that the "Ultrawet" surfactant does not work well with clay. In this event No. 130 ethyl acrylate from GAF Corporation can be used as a binder and surfactant. It is a vinyl pyrrolidone copolymer. The vinyl acetate or ethyl acrylate help as dispersants for the pigment, binders for adhesion to the product, and moisture resisting agents in the end product. The range of percentages in which they may be employed is from 5 to 60 percent. However if more than 20 percent is used, the solution will become milky while mixing and during application. Therefore, where good appearance or clarity of the coating is important, it appears that 20 percent is the upper limit. About 8 percent is believed preferable.

I have found that it is much preferable to make a slurry of the pigment with water and the surfactant before the silicate is added. Adding powder to the silicate first will tend to result in seediness. Although use of a surfactant is not absolutely essential, it is an asset for complete surface wetting, stability of the solution and dispersion of pigments.

Mixing equipment other than the Red Devil shaker and container with shot, may also be used. However it is important that the equipment be capable of thoroughly mixing the ingredients. The powder is to be beat or "sheared" into the silicate solution. Where the container with shot therein has been employed on a shaker, 2 pounds of BB's in a gallon container works very satisfactorily.

If desired, on certain products, the absence of opaque material in selected locations can be effected by mechanical removal of the opaque coating at such locations by means other than sanding, or by chemical removal, or by masking prior to application of the opaque coating.

In the curing steps, my efforts indicate that it is best to eliminate a major portion of the moisture at a metal temperature just below the boiling point. This avoids formation of a crust, with subsequent deterioration thereof at higher temperatures. Nevertheless, for the coating to withstand high in-use temperatures and moisture concentrations in its environment, high bake curing is desirable. It is believed that the optimum curing condition is that which would cause the dry silicates to flow together and force out moisture, rather than harden quickly and trap moisture. If the applied wet film thickness is considerably under 1 mil, 0.1 mil for example, 300° is quite satisfactory for a cure temperature after each coat preceding the final coat. However, if the applied wet film thickness approaches 0.5 mil, higher temperatures are required, 500° for example, before application of another coat. It is believed that my inclusion of clay better enables the cure to proceed from the metal surface outward and thus tolerate higher curing temperatures at greater film thickness, without frosting. It thus helps avoid the formation of a crust.

In the foregoing description, the purpose of the crisscross coating is to provide a uniform and homogeneous coating. It should not be misinterpreted as implying that the coating is in streaks or strips or in a grid form. Also I have mentioned use of channel black powder as a pigment. Other pigments for various colors may also be used.

Referring again to the inclusion of clay, I have found that from 5 to 10 percent by volume is helpful in both the clear and opaque solutions. The higher the percentage of clay, the better is the mar resistance. Percentages higher than 10 percent may improve mar resistance, but will tend to result in discoloration during mixing, application and cure. Therefore, for clear solutions, about 10 percent clay is the upper practical limit. For opaque solutions, where the color needed can be obtained in spite of the discoloration or milkiness which higher clay percentages produce, the clay can be increased accordingly. I believe that 50 percent clay is about the practical limit.

The invention claimed is:

1. A process of coating a member and comprising the steps of:
   blasting the surface of the member with an abrasive material;
   applying to said surface a clear coating of a solution of an alkali metal silicate;
   curing at a temperature in excess of 250° F;
   applying to said surface a non-clear coating of a solution of an alkali metal silicate;
   air drying said non-clear coating;
   removal of a portion of said non-clear coating;
   curing said non-clear coating at a temperature in excess of 350° F;
   applying to said surface a clear coating of a solution of an alkali metal silicate;
   cure at a temperature in excess of 450° F.

2. The process of claim 1 wherein:
   each of said coatings is applied by spraying in a crisscross pattern.

3. The process of claim 1 wherein:
   said first mentioned curing step is performed for a period in excess of 20 minutes.

4. The process of claim 1 wherein:
   said air drying step is performed for a period of at least 5 minutes.

5. The process of claim 1 wherein:
   said second mentioned curing step is performed for a period in excess of 20 minutes.

6. The process of claim 1 wherein:
   said third mentioned curing step is performed for a period in excess of 20 minutes.

7. The process of claim 1 wherein:
   said first, second, and third mentioned curing steps are performed at temperatures of 300° F for 30 minutes, 400° F for 30 minutes, and 500° F for 30 minutes, respectively.

8. A process of coating a member and comprising the steps of:
   applying to an exterior surface of said member one coating of a non-clear solution of an alkali metal silicate;
   air drying said coating;
   omitting said coating at spaced locations on said surface;
   curing said coating;
   applying to said surface a next coating of a clear solution of an alkali metal silicate;
   and curing said next coating.

9. The process of claim 8 wherein:
   omission of said one coating is achieved by removal thereof at said locations,
   said next coating is applied to said surface over said one coating and over said locations where said one coating has been removed.

10. The process of claim 8 wherein:
    the curing of said next coating is done first at a member temperature between 180° and 210° F for a period of between 5 minutes and 25 minutes, and then at a member temperature between 450° and 550° F for a period between 5 minutes and 25 minutes.

* * * * *